United States Patent Office 3,102,897
Patented Sept. 3, 1963

3,102,897
6-HALO-19-NOR-Δ4,6-ANDROSTADIEN-17β-OL-3-ONE DERIVATIVES
Howard J. Ringold and John A. Zderic, Mexico City, Mexico, assignors, by mesne assignments, to Syntex Corporation, a corporation of Panama
No Drawing. Filed Nov. 30, 1959, Ser. No. 856,010
Claims priority, application Mexico Dec. 3, 1958
25 Claims. (Cl. 260—397.4)

The present invention relates to new cyclopentanophenanthrene derivatives and to processes for the production of the same.

More particularly, it relates ot the novel 6-halo-17α-(aliphatic hydrocarbyl) - 19-nor-Δ4,6-androstadien-17β-ol-3-ones, as well as to their esters The halogen at 6-position is either chlorine, bromine or fluorine. Aliphatic hydrocarbyl or "aliphatyl" radicals are radicals of hydrocarbons of up to 8 carbon atoms, including those having triple bonds in their chain, i.e., alkyls such as methyl, ethyl, propyl, butyl, isobutyl and alkinyls such as ethinyl, propinyl-(1), butinyl-(1), etc.; by "esters" as used in this application we mean those formed with the acyl radicals of hydrocarbon carboxylic acids of up to 12 carbon atoms, which are saturated or unsaturated, of straight, branched, cyclic or mixed aliphatic cyclic chain, and which may further be substituted with functional groups such as hydroxyl, O-acyl, alkoxy (of up to 5 carbon atoms) or halogen; typical esters are, among others, the acetates, propionates, butyrates, hemisuccinates, enanthates, caproates, benzoates, trimethylacetates, phenoxyacetates, cyclopentylpropionates and β-chloropropionates.

The novel 6-halo-17-α-aliphatyl-19-nor-Δ4,6-androstadien-17β-ol-3-ones are represented by the general formula:

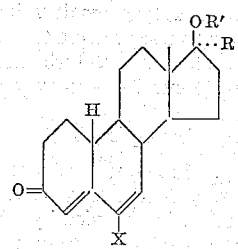

wherein X is selected from the group consisting of fluorine, chlorine and bromine, R represents the aliphatyl substitutent and R' is a member of the group consisting of hydrogen and the acyl radical of a hydrocarbon carboxylic acid of the class defined above.

The novel 6-halo compounds, as well as their non-halogenated analogs which are intermediate in their synthesis as will be described further below are potent progestational hormones.

For preparing the above new compounds which are the object of the present invention, we started from the corresponding compounds without substituent and without double bond a C–6, that is, from the 17α-aliphatyl-19-nor-Δ4-androsten-17β-ol-3-ones, and used a process described by Ringold, Djerassi and Velasco in patent application Serial No 826,120, filed July 10, 1959, which process comprises, in combination, that a double bond is first introduced at C–6 to produce the 17α-aliphatyl-19-nor-Δ4,6-androstadien-17β-ol-3-ones, whereupon the new double bond is oxidized to form a 6α,7α-epoxide, and the latter is then treated with a hydrogen halide being either hydrogen chloride, hydrogen bromide or hydrogen fluoride to obtain the desired 6-halo-6-dehydro compounds, either in a single step or in two steps, isolating in the latter case a 6β-halo-7α-hydroxy intermediate which is further dehydrated.

The above process is illustrated by the following reaction diagram, wherein X, R, and R' have the same meaning as explained hereinbefore:

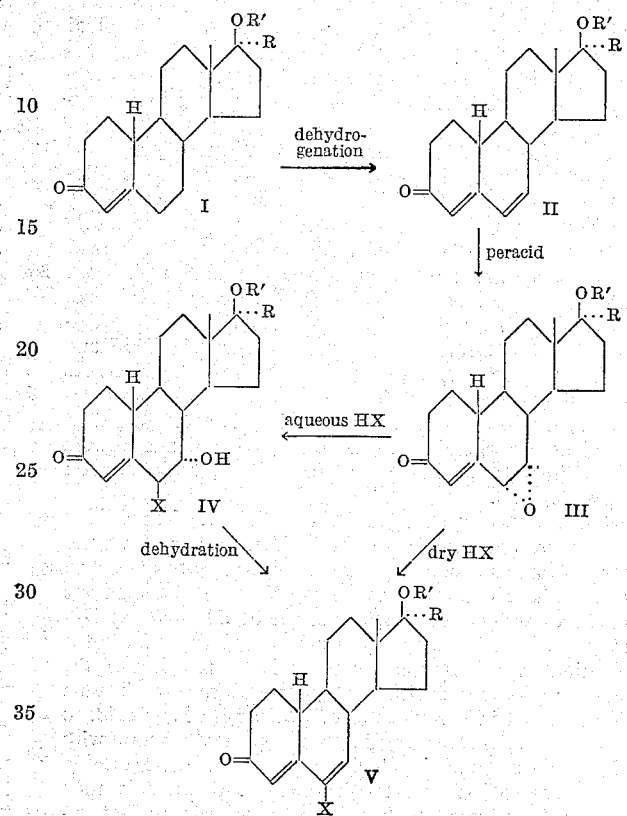

As a first step in the process of the invention the introduction of a double bond at C–6 into the starting compound I is carried out by reaction with a quinone of adequate oxidation-reduction potential such as chloranil, for example by refluxing a solution of the steroid I in a mixture of ethyl acetate, and glacial acetic acid with chloranil. The epoxidation of the double bond of compound II then is effected with an appropriate peracid, such as for example with monoperphthalic acid in a mixture of methylene chloride and ether; the conversion of the 6α,7α-epoxide III into the 6-halo-6-dehydro compound V comprises the opening of the epoxide ring by the addition of the elements of the hydrogen halide and the subsequent dehydration on the resulting intermediate 6β-halo-7α-hydroxy compound IV. For preparing the 6-fluoro-6-dehydro compounds we treat the epoxides first with hydrogen fluoride in mixture with tetrahydrofurane and chloroform, at low temperature, and the resulting 6β-fluoro-7α-hydroxy compound is dehydrated through the action of dry hydrogen chloride in acetic acid solution. For preparing the 6-chloro-6-dehydro compounds there is no need of using two separate reactions, but the opening of the epoxide ring and the dehydration are achieved in a single step by treating the epoxide with dry hydrogen chloride in glacial acetic acid solution. In the same manner, for preparing the 6-bromo-6-dehydro compounds, the epoxides are treated with dry hydrogen bromide in glacial acetic acid at room temperature for 2 hours.

The introduction of the double bond in C–6,7 of the starting 17α - aliphatyl-19-nor-Δ4-androsten - 17β-ol-3-one may be carried out using the free alcohol or an ester of the said starting compound. When the substituent in C-17α is a radical of an acetylenic hydrocarbon, surprisingly it is not necessary to protect the hydroxyl group in C-17, during the final dehydration step, whereas the 17α-alkyl-e.g. the 17α-methyl-compounds, may be protected by esterification against dehydration in C-17. The 17α-alkyl-19-nor-Δ$^{4,6}$-androstadien-17β-ol-3-ones were, therefore, esterified prior to epoxidation, conveniently by heating their pyridine solution with an acid anhydride at 90° for a period between 8 and 72 hours. The final dehydration step yielded the respective 6-halo-6-dehydro-compound esterified at C-17β; if desired, the esters can be converted into the free alcohols by mild alkaline hydrolysis.

It is also possible to first introduce the halogen atoms at C-6 and then the double bond at C-6. Thus, the halogen substituent can be introduced first to produce the 6α-halo- or 6β-halo-Δ$^4$-3-ketones which have previously been described, for example, in the patent applications of Bowers, Djerassi, Ringold and Zderic, Serial Nos. 775,397, now U.S. patent No. 3,028,401; 776,689, now abandoned; 776,694, now abandoned and 804,153, filed on November 30, 1957, December 21, 1957, February 11, 1958 and April 8, 1958, respectively. These 6-halo-Δ$^4$-3-ketones are subjected to a reaction with chloranil and thus dehydrogenated at C-6,7 as described by Ringold in patent application Serial No. 826,121 and by Ringold and Bowers in patent application Serial No. 826,119, both filed on July 10, 1959.

The process according to the invention may be modified within relatively wide limits, both with regard to the reagents and solvents employed as well as with respect to the conditions of temperature and time for effecting the operations. The introduction of the double bond at C-6 may be carried out by other methods different from the reaction with chloranil, for example by reaction of the starting Δ$^4$-3-ketone with an alkyl orthoformate in dioxane solution and in the presence of p-toluenesulfonic acid, to obtain a 3-enol ether which upon subsequent reaction with N-bromo-acetamide in a buffered aqueous acetone solution produces a 6β-bromo-Δ$^4$-3-ketone. The latter is then dehydrobrominated with calcium carbonate in hot dimethylformamide solution.

The invention will be further illustrated but not limited by the following examples:

Example I

A mixture of 5 g. of 17α-ethynyl-19-nor-testosterone described by Djerassi et al. in J. Am. Chem. Soc., 76, 4092 (1954), 10 g. of chloranil, 125 cc. of ethyl acetate and 25 cc. of glacial acetic acid was refluxed under an atmosphere of nitrogen for 20 hours. The solution was cooled, washed with 1% aqueous sodium hydroxide solution until the washings were colorless, dried over anhydrous sodium sulfate and evaporated to dryness under reduced pressure. Chromatography on neutral alumina yielded 17α-ethynyl-19-nor-Δ$^{4,6}$-androstadien-17β-ol-3-one; M.P. 251–252°; [α]$_D$ —151° (chloroform);

$$\lambda_{max.}^{EtOH} \ 284 \ m\mu, \log \epsilon \ 4.38$$

A solution of 3 g. of the above dienone in 200 cc. of methylene chloride was mixed with 200 cc. of a 5.5% solution of monoperphthalic acid (6 molar equivalents) in ether and kept for 48 hours at room temperature; the mixture was then washed with 5% aqueous sodium carbonate solution and water, dried over anhydrous sodium sulfate and concentrated until crystallization started. The mixture was cooled and the precipitate was collected by filtration and air-dried. There was obtained 17α-ethynyl-19-nor-6α,7α-oxido-testosterone;

$$\lambda_{max.}^{EtOH} \ 240–242 \ m\mu, \log \epsilon \ 4.18$$

A solution of 2 g. of 17α-ethynyl-19-nor-6α,7α-oxido-testosterone in 160 cc. of anhydrous chloroform was cooled in a Dry Ice-acetone bath at —70° C. and treated with a mixture of 4.5 cc. of anhydrous tetrahydrofurane and 3.2 g. of dry hydrogen fluoride, little by little and under stirring. The mixture was allowed to reach room temperature and kept for 20 hours at this temperature; it was then poured into 1 lt. of 5% aqueous potassium carbonate solution mixed with ice, under vigorous stirring; the organic layer was separated, washed with water to neutral, dried over anhydrous sodium sulfate and evaporated to dryness. The residue consisted of the crude 6β-fluoro-7α-hydroxy-17α-ethynyl-19-nor-testosterone.

A slow stream of dry hydrogen chloride was introduced into a solution of 2 g. of the above compound in 100 cc. of glacial acetic acid until saturation and then the container was closed by a stopper and kept at room temperature for 4 hours; after pouring into ice cold salt solution, the product was extracted with methylen chloride, the extract was washed with 5% aqueous sodium carbonate solution and water, dried over anhydrous sodium sulfate and evaporated to dryness, thus leaving as a residue 17α-ethynyl-6-fluoro-19-nor-Δ$^{4,6}$-androstadiene-17β-ol-3-one.

Example II 5 g. of 17α-ethynyl-19-nor-testosterone acetate (German Patent 1,017,166) were dehydrogenated with chloranil, exactly as described in Example I, to produce the acetate of 17α-ethynyl-19-nor-Δ$^{4,6}$-androstadiene-17β-ol-3-one, M.P. 177–178° C.; [α]$_D$ —178° (chloroform);

$$\lambda_{max.}^{EtOH} \ 282–284 \ m\mu, \log \epsilon \ 4.44$$

Subsequent epoxidation, as described in Example I yielded the 17α-ethynyl-6α,7α-oxido-19-nor-Δ$^4$-androstene-17β-ol-3-one-acetate; following the technique described in said example this was treated with hydrogen fluoride to give 17α-ethynyl-6β-flouro-7α-hydroxy-19-nor-testosterone-acetate and reaction of the aforesaid compound with dry hydrogen chloride yielded 17α-ethynyl-6-fluoro-19-nor-Δ$^{4,6}$-androstadiene-17β-ol-3-one acetate.

A solution of 1 g. of the latter acetate in 100 cc. of methanol containing 0.5 g. of potassium hydroxide was refluxed for 1 hour. The solution was neutralized with acetic acid, concentrated to a small volume and poured into 500 cc. of water. The precipitate was collected and crystallized from acetone-ether, thus affording the free 17α-ethynyl-6-fluoro-19-nor-Δ$^{4,6}$-androstadiene-17β-ol-3-one.

Example III

A solution of 2 g. of 17α-methyl-19-nor-testosterone in 10 cc. of pyridine was heated with 4 cc. of acetic anhydride, at a temperature in the vicinity of 90° C. for 48 hours. The mixture was poured into water, heated for 1 hour on a steam bath, then cooled and the solid collected by filtration, washed with water, dried and recrystallized from acetone-hexane. There was obtained 17α-methyl-19-nor-testosterone-acetate.

2 g. of the above compound were dehydrogenated with chloranil following the procedure of Example I, to obtain 17α-methyl-19-nor-Δ$^{4,6}$-androstadiene-17β-ol-3-one acetate; subsequent treatment with monoperphthalic acid yielded 17α-methyl-6α,7α-oxido-19-nor-Δ$^4$-androstene-17β-ol-3-one acetate; this compound was submitted to the reaction with hydrogen fluoride to give 17α-methyl-6β-fluoro-19-nor-Δ$^4$-androstene-7α,17β-diol-3-one 17-acetate; finally, by treatment with hydrogen chloride in acetic acid, 17α-methyl-6-fluoro-19-nor-Δ$^{4,6}$-androstadiene-17β-ol-3-one acetate was obtained.

By hydrolysis as described in Example II, free 17α-methyl-6-fluoro-19-nor-Δ$^{4,6}$-androstadiene-17β-ol-3-one was prepared.

Example IV

17α-ethynyl-6α,7α-oxido-19-nor-testosterone obtained in accordance to Example I was treated with hydrogen chloride in acetic acid under anhydrous conditions as described in said example. Thus 17α-ethynyl-6-chloro-19-nor-Δ$^{4,6}$-androstadiene-17β-ol-3-one was obtained.

Example V

17α-ethynyl-6α,7α-oxide-19-nor-testosterone acetate obtained in accordance to Example II was treated with hydrogen chloride in acetic acid under anhydrous conditions as described in Example I. Thus 17α-ethynyl-6-chloro-19-nor-$\Delta^{4,6}$-androstadiene-17β-ol-3-one acetate was obtained. By hydrolysis as described in Example II free 17α-ethynyl-6-chloro-19-nor-$\Delta^{4,6}$-androstadiene-17β-ol-3-one was prepared.

Example VI

The procedure of Example V was repeated with 17α-methyl-6α,7α-oxido-19-nor-$\Delta^4$-androstene-17β-ol-3-one acetate, obtained in accordance with Example III. Thus 17α-methyl-6-chloro-19-nor-$\Delta^{4,6}$-androstadiene-17β-ol-3-one acetate was obtained which was hydrolyzed to free 17α-methyl-6-chloro-19-nor-$\Delta^{4,6}$-androstadiene-17β-ol-3-one by the method described in Example II.

Example VII

The procedure of Example IV was repeated, but utilizing hydrogen bromide instead of hydrogen chloride, under the same conditions, to afford 17α-ethynyl-6-bromo-19-nor-$\Delta^{4,6}$-androstadiene-17β-ol-3-one.

Example VIII

The procedure of Example V was repeated but utilizing hydrogen bromide instead of hydrogen chloride under the same conditions to afford 17α-ethynyl-6-bromo-19-nor-$\Delta^{4,6}$-androstadiene-17β-ol-3-one acetate.

Example IX

The procedure of Example VI was repeated, but utilizing hydrogen bromide instead of hydrogen chloride, under the same conditions, to afford 17α-methyl-6-bromo-19-nor-$\Delta^{4,6}$-androstadiene-17β-ol-3-one acetate which was hydrolyzed to free 17α-methyl-6-bromo-19-nor-$\Delta^{4,6}$-androstadiene-17β-ol-3-one by the method described in Example II.

Example X

A solution of 5.65 g. of 17α-ethynyl-19-nor-testosterone in a mixture of 28 cc. of dioxane and 5.65 cc. of ethylorthoformate was treated with 0.72 cc. of a solution of p-toluenesulfonic acid in dioxane (prepared by dissolving 0.488 g. of p-toluenesulfonic acid in 5.4 cc. of dry dioxane and 1.1 cc. of absolute ethanol) and stirred at room temperature for 75 minutes, 2 cc. of pyridine were then added and the solution was evaporated to dryness. The crystalline residue was washed with hexane and the crude product was crystallized from hexane, thus affording 17α-ethynyl-3-ethoxy-19-nor-$\Delta^{3,5}$-androstadiene-17β-ol, having a M.P. of 187–189° C.; [α]$_D$ —228° (chloroform);

$$\lambda_{max.}^{EtOH}\ 242\ m\mu,\ \log\ \epsilon\ 4.35$$

A solution of 4.1 g. of the above product in 70 cc. of acetone was successively treated with 2.5 g. of sodium acetate, 25 cc. of water, 3.31 g. of N-bromosuccinimide and 1.04 cc. of acetic acid. The mixture was stirred at a temperature of 5° C. for 75 minutes, an excess of water was added and the product was extracted with ether. The solvent was evaporated and the residue was refluxed for 1 hour under an atmosphere of nitrogen with 8.0 g. of calcium carbonate in 100 cc. of dimethylformamide. The mixture was filtered, the insoluble discarded and the filtrate evaporated to dryness under reduced pressure. Crystallization of the residue from methanol furnished 17α-ethynyl-19-nor-$\Delta^{4,6}$-androstadiene-17β-ol-3-one, identical with the intermediate described in Example I.

Subsequent acetylation, as described in Example III, afforded 17α-ethynyl-19-nor-$\Delta^{4,6}$-androstadiene-17β-ol-3-one acetate identical with the intermediate described in Example II.

Example XI

Exactly as described in the foregoing example, 17α-ethynyl-19-nor-testosterone acetate was converted into its enolether. Treatment with N-bromosuccinimide and dehydrobromination afforded 17α-ethynyl-19-nor-$\Delta^{4,6}$-androstadiene-17β-ol-3-one acetate.

Example XII

Exactly as described in Example X, 17α-methyl-19-nor-testosterone was converted into its enolether. Treatment with N-bromosuccinimide and dehydrobromination afforded 17α-methyl-19-nor-$\Delta^{4,6}$-androstadiene-17β-ol-3-one, which was acetylated by the procedure described in Example III, to afford 17α-methyl-19-nor-$\Delta^{4,6}$-androstadiene-17β-ol-3-one acetate, identical with the intermediate of Example III.

Example XIII

Exactly as described in Example X, 17α-methyl-19-nor-testosterone acetate, obtained as described in Example III was converted to its enolether. Treatment with N-bromosuccinimide and dehydrobromination gave 17α-methyl-19-nor-$\Delta^{4,6}$-androstadiene-17β-ol-3-one acetate identical to the intermediate of Example III.

Example XIV

17α-methyl-19-nor-testosterone was converted into 17α-methyl-19-nor-$\Delta^{4,6}$-androstadiene-17β-ol-3-one by the reaction with chloranil, described in Example I. Subsequent acetylation, as described in Example III, afforded 17α-methyl-19-nor-$\Delta^{4,6}$-androstadiene-17β-ol-3-one acetate identical with the intermediate mentioned in Example III.

Example XV

A mixture of 5 g. of 17α-ethyl-nor-testosterone, described by Colton et al. in J. Am. Chem. Soc. 79, 1123 (1957), 50 cc. of cyclopentylpropionic anhydride and 500 mg. of p-toluenesulfonic acid was kept at room temperature for 12 hours, poured into ice water, heated on the steam bath for 1 hour to hydrolyze the excess of anhydride and extracted several times with ether. The extract was washed with water, aqueous sodium bicarbonate solution and water, dried over anhydrous sodium sulfate and evaporated to dryness. The residue was treated with 100 cc. of 1% methanolic potassium hydroxide for 1 hour at temperatures around 0° C. and then acidified with acetic acid, concentrated to a small volume and diluted with water. The precipitate consisting of crude 17-cyclopentylpropionate of 17α-ethyl-nor-testosterone was collected by filtration and purified by recrystallization from acetone-hexane.

To a solution of 5 g. of 17-cyclopentylpropionate of 17α-ethyl-nor-testosterone in 35 cc. of anhydrous dioxane there was added 5 cc. of ethyl orthoformate and 150 mg. of p-toluenesulfonic acid monohydrate and the mixture was stirred for 30 minutes; with cooling and stirring there were then slowly added 12 cc. of pyridine and 500 cc. of water. The mixture was extracted with ether and the extract was washed with water, dried over anhydrous sodium sulfate and evaporated to dryness under reduced pressure. Recrystallization of the residue from methanol furnished the 3-ethyl-enol-ether of 17α-ethyl-nor-testosterone-cyclopentylpropionate.

A mixture of 5 g. of the above compound, 2 g. of sodium acetate, 100 cc. of acetone and 20 cc. of water was cooled to 0° C., treated with 2 g. of N-chlorosuccinimide and 2 cc. of glacial acetic acid and stirred for 30 minutes at a temperature between 0 and 5° C. The mixture was then diluted with 250 cc. of water and kept overnight in the refrigerator. The precipitate formed was collected, washed with water, dried under vacuum and crystallized from acetone. There was thus obtained 6β-chloro-17α-ethyl-19-nor-testosterone-cyclopentylpropionate.

5 g. of the cyclopentylpropionate of 6β-chloro-17α-ethyl-19-nor-testosterone was dehydrogenated by the reaction with chloranil, as described in Example I, to produce the cyclopentylpropionate of 6-chloro-17α-ethyl-19-nor-$\Delta^{4,6}$-androstadiene-17β-ol-3-one.

Examples XVI–XXIII

In accordance with the esterification procedure described in Example III, but using propionic anhydride instead of acetic anhydride, the following propionates were prepared:

| Examples | Starting materials | Final product |
|---|---|---|
| XVI | 17α-ethynyl-19-nor-Δ$^{4,6}$-androstadiene-17β-ol-3-one. | propionate of 17α-ethynyl-19-nor-Δ$^{4,6}$-androstadiene-17β-ol-3-one. |
| XVII | 17α-methyl-19-nor-Δ$^{4,6}$-androstadiene-17β-ol-3-one. | propionate of 17α-methyl-19-nor-Δ$^{4,6}$-androstadiene-17β-ol-3-one. |
| XVIII | 17α-ethynyl-6-fluoro-19-nor-Δ$^{4,6}$-androstadiene-17β-ol-3-one. | propionate of 17α-ethynyl-6-fluoro-19-nor-Δ$^{4,6}$-androstadiene-17β-ol-3-one. |
| XIX | 17α-ethynyl-6-chloro-19-nor-Δ$^{4,6}$-androstadiene-17β-ol-3-one. | propionate of 17α-ethynyl-6-chloro-19-nor-Δ$^{4,6}$-androstadiene-17β-ol-3-one. |
| XX | 17α-ethynyl-6-bromo-19-nor-Δ$^{4,6}$-androstadiene-17β-ol-3-one. | propionate of 17α-ethynyl-6-bromo-19-nor-Δ$^{4,6}$-androstadiene-17β-ol-3-one. |
| XXI | 17α-methyl-6-fluoro-19-nor-Δ$^{4,6}$-androstadiene-17β-ol.3.one. | propionate of 17α-methyl-6-fluoro-19-nor-Δ$^{4,6}$-androstadiene-17β-ol-3-one. |
| XXII | 17α-methyl-6-chloro-19-nor-Δ$^{4,6}$-androstadiene-17β-ol-3-one. | propionate of 17α-methyl-6-chloro-19-nor-Δ$^{4,6}$-androstadiene-17β-ol-3-one. |
| XXIII | 17α-methyl-6-bromo-19-nor-Δ$^{4,6}$-androstadiene-17β-ol-3-one. | propionate of 17α-methyl-6-bromo-19-nor-Δ$^{4,6}$-androstadiene-17β-ol-3-one. |

Examples XXIV–XXXI

Instead of the propionic anhydride as used in the foregoing examples, cyclopentylpropionic anhydride was used, prolonging the reaction time to 96 hours, and the cyclopentylpropionoxy analogs of the compounds enumerated in said examples were obtained.

Examples XXXII–XXXIV

Following the procedure set forth in particular under Examples I, IV and VII, there were prepared the following new compounds II from the cited starting materials I:

| Examples | I | II |
|---|---|---|
| | Derivatives of 19-nor-testosterone— | Derivatives of 19-nor-Δ$^{4,6}$-androstadiene-17β-ol-3-one— |
| XXXII | 17α-ethyl-17β-acetate | (a) 6-fluoro-17α-ethyl-17β-acetate. |
| | | (b) 6-chloro-17α-ethyl-17β-acetate. |
| | | (c) 6-bromo-17α-ethyl-17β-acetate. |
| XXXIII | 17α-propyl-17β-acetate | (a) 6-fluoro-17α-propyl-17β-acetate. |
| | | (b) 6-chloro-17α-propyl-17β-acetate. |
| | | (c) 6-bromo-17α-propyl-17β-acetate. |
| XXXIV | 17α-(propinyl-(1)) | (a) 6-fluoro-17α-propinyl-(1). |
| | | (b) 6-chloro-17α-propinyl-(1). |
| | | (c) 6-bromo-17α-propinyl-(1). |

Example XXXV

17α-ethyl-nor-testosterone cyclopentylpropionate obtained in accordance with Example XVI, was converted into its enol ether by the procedure of Example X. Treatment with N-bromosuccinimide and dehydrobromination afforded 17α-ethyl-19-nor-Δ$^{4,6}$-androstadiene-17β-ol-3-one cyclopentylpropionate. Following the procedure of Example I, the 6α,7α-epoxide was prepared, the epoxide ring was opened by reaction with hydrogen fluoride, and final dehydration yielded 17α-ethyl-6-fluoro-19-nor-Δ$^{4,6}$-androstadiene-17β-ol-3-one cyclopentylpropionate.

We claim:
1. A compound having the general formula

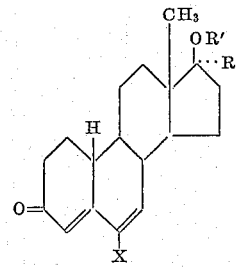

wherein X is selected from the group consisting of fluorine, chlorine and bromine, R is a hydrocarbon radical of up to 8 carbon atoms, selected from the group consisting of aliphatic saturated and acetylenic hydrocarbons, and R' is selected from the group consisting of hydrogen and the acyl radical of a hydrocarbon carboxylic acid having up to 12 carbon atoms.

2. A compound described in claim 1, in which R is methyl.
3. A compound as described in claim 1, in which R is ethyl.
4. A compound as described in claim 1, in which R is ethynyl.
5. A compound as described in claim 1, in which R is propinyl(-1).
6. A compound as described in claim 1, in which R is propyl.
7. A compound as described in claim 1, in which X is fluorine.
8. A compound as described in claim 1, in which X is chlorine.
9. A compound as described in claim 1, in which X is bromine.
10. A compound as described in claim 1, in which R' is a hydrogen atom.
11. A compound as described in claim 1, in which R' is acetyl.
12. A compound as described in claim 1, in which R' is propionyl.
13. A compound as described in claim 1, in which R' is cyclopentyl propionyl.
14. 17α-methyl-6-fluoro - 19 - nor-Δ$^{4,6}$-androstadiene-17β-ol-3-one.
15. 17α-methyl-6-chloro - 19 - nor-Δ$^{4,6}$-androstadiene-17β-ol-3-one.
16. 17α-methyl-6-bromo - 19 - nor-Δ$^{4,6}$-androstadiene-17β-ol-3-one.
17. 17α-ethynyl-6-fluoro - 19 - nor - Δ$^{4,6}$ - androstadiene-17β-ol-3-one.
18. 17α-ethynyl-6-chloro - 19 - nor-Δ$^{4,6}$-androstadiene-17β-ol-3-one.
19. 17α-ethynyl-6-bromo - 19 - nor-Δ$^{4,6}$-androstadiene-17β-ol-3-one.
20. 17α-methyl-6-fluoro - 19 - nor-Δ$^{4,6}$-androstadiene-17β-ol-3-one propionate.
21. 17α-ethynyl-6-fluoro - 19 - nor-Δ$^{4,6}$-androstadiene-17β-ol-3-one propionate.
22. 17α-ethynyl-6-fluoro - 19 - nor-Δ$^{4,6}$-androstadiene-17β-ol-3-one cyclopentylpropionate.
23. 17α-methyl-6-chloro - 19 - nor-Δ$^{4,6}$-androstadiene-17β-ol-3-one propionate.
24. 17α-ethynyl-6-chloro - 19 - nor-Δ$^{4,6}$-androstadiene-17β-ol-3-one propionate.
25. 17α-ethynyl - 19 - nor-Δ$^{4,6}$-androstadiene-17β-ol-3-one.

References Cited in the file of this patent
UNITED STATES PATENTS

| 2,739,974 | Colton | Mar. 27, 1956 |
| 2,946,809 | Colton | July 26, 1960 |